J. SCHIESSLER.
APPARATUS FOR PRODUCING OSCILLATING CURRENT.
APPLICATION FILED APR. 20, 1908.
1,198,776.
Patented Sept. 19, 1916.
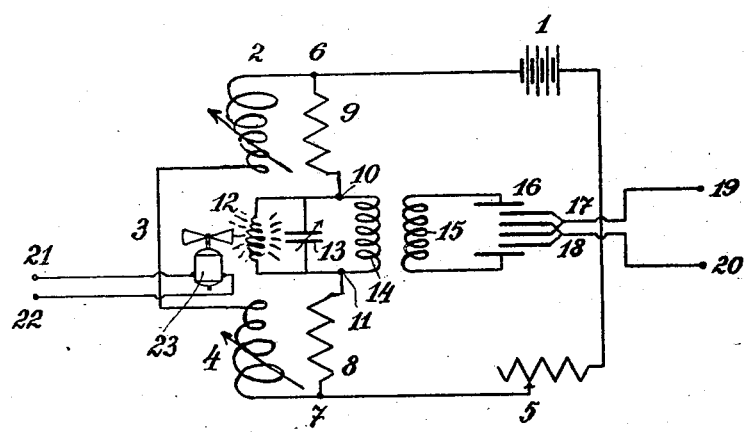
Inventor
Josef Schiessler
by Hunyorth Jo
atty.

UNITED STATES PATENT OFFICE.

JOSEF SCHIESSLER, OF BADEN, NEAR VIENNA, AUSTRIA-HUNGARY.

APPARATUS FOR PRODUCING OSCILLATING CURRENT.

1,198,776.                    Specification of Letters Patent.       Patented Sept. 19, 1916.

Application filed April 20, 1908. Serial No. 428,255.

*To all whom it may concern:*

Be it known that I, JOSEF SCHIESSLER, residing at Baden, near Vienna, Austria-Hungary, a subject of the Emperor of Austria-Hungary, have invented certain new and useful Improvements in Apparatus for Producing Oscillating Current; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to oscillating electric circuits, and embraces the use in such a circuit of a stable incandescent resistance. Arcs which are unstable have heretofore been used.

The accompanying drawing is a diagram illustrating mechanism for producing electrical oscillations in accordance with my invention.

A source of direct current 1 supplies current to a circuit containing two, preferably adjustable, windings or coils 2 and 4 connected in series by the connecting conductor 3. The arrows indicate the adjustability of these windings. The strength of current in the windings 2 and 4 and therefore the strength of the magnetic field produced by the windings or magnet coils 2 and 4 may be regulated at will by means of regulable resistance 5 in the circuit of battery 1.

Branching from points 6 and 7 are symmetrically arranged resistances 9 and 8 which act as choking coils that are connected at 10 and 11 to a completely closed circuit 12—14. In this closed circuit is the incandescible resistance 12 which may be of platinum arranged in parallel with the windings 2, 4, and preferably placed between them in axial alinement. The incandescible resistance 12, illustrated as a winding, is connected in parallel with a regulable condenser 13. The condenser 13 is connected to the primary winding 14, having self induction, of a transformer 14—15 and forms a regulable oscillating circuit. The secondary winding 15 of the transformer is connected to the end plates 16 of a capacity coupling whose inner plates of like sign are connected by the conductors 17 and 18 to the terminals 19 and 20, respectively, to which any desired apparatus is connected.

In front of the incandescent resistance is arranged means for blowing a blast or current of air onto the resistance, for example, an electrically driven fan 23 supplied with current through terminals 21 and 22.

As the invention involves primarily the energetic cooling of an incandescent solid resistance arranged in a magnetic field, the blower or fan must produce a rotating blast that must be increased with the increase in the transformation of energy. Consequently the speed of rotation of the blower must be increased, and naturally the superimposed tone will then be higher in pitch.

The operation will be as follows: Current being supplied from the source 1, the platinum resistance winding 12 and the magnet windings 2 and 4 will be traversed by current. The magnet windings 2 and 4 will produce a strong magnetic field whose intensity can be regulated by the adjustable resistance 5. The incandescent resistance or winding 5 is arranged in the field produced by the windings 2 and 4 and coaxially thereof, and the temperature of the resistance may be controlled by the resistances 8 and 9 to any desired extent. If the fan be now set in motion, the strong current of air produced by the fan cools the resistance 12 energetically, and the temperature variations produced by this blast of air in the incandescent resistance 12 produce variations of resistance, and these variations of resistance produce in turn tension and current variations. There results in the oscillating circuit 13, 14 in parallel to the incandescent resistance 12, oscillations whose frequency is directly dependent upon the blast from the rotary fan 23 and upon the magnetic fields of the windings 2 and 4. The action of the magnetic field is intensified by the fact that the incandescent resistance 12 is in the form of a solenoid or winding.

The two magnetic fields produced by coils 2, 4 and coil 12 respectively, mutually affect one another, and according to their polarity, either mutually intensify or weaken one another. For this purpose the magnet windings 2 and 4 are arranged to be continually slidable or movable. The oscillations produced are transferred by the primary winding 14 of the transformer to the secondary winding 15.

Any suitable apparatus is connected to the circuit 13—14 by means of the capacitative coupling 16 and condensers 17 and 18 and terminals 19, 20.

The mechanism illustrating my invention, and shown by way of example, may be varied without departing from my invention.

I claim—

1. In mechanism for producing electrical oscillations, the combination with an incandescent solid resistance, of a capacity and self induction in parallel therewith and means to direct a current of cooling air or gas onto said resistance.

2. In mechanism for producing electrical oscillations, the combination with an incandescent solid resistance; of a capacity and self induction in parallel therewith and a rotary fan arranged to direct a cooling blast onto said resistance.

3. In mechanism for producing electrical oscillations, the combination with means to produce a strong magnetic field; of a solid incandescent resistance co-axially arranged in said field, a self induction and a capacity in parallel with said resistance, and means to direct a current of air onto said resistance.

4. In mechanism for producing electrical oscillations, the combination with a solid incandescent resistance; of a capacity and a self induction in parallel therewith, means to produce a magnetic field co-axial with said resistance, and means to direct a cooling current of air onto said resistance.

5. In apparatus for producing electrical oscillations, a circuit containing a solid incandescent resistance having self induction, a capacity and self induction in parallel with said resistance, means to produce a strong magnetic field co-axial with said resistance and a rotary fan, arranged to direct a current of cooling air onto said resistance, whose revolutions and number of blades are in direct relation to the oscillations superposed on said circuit.

6. In apparatus for producing electrical oscillations, a solid, inductive incandescent resistance, a capacity and self induction in parallel with said resistance, adjustable means to produce a variable magnetic field co-axial with said resistance, and a rotary fan to direct a blast of air onto said resistance.

7. In apparatus for producing electrical oscillations, an incandescent resistance winding heated by electric current, a pair of windings connected in series adjacent said resistance and parallel therewith and supplied with electric current, said windings being adjustable with respect to said resistance, and an oscillating circuit in parallel with said resistance.

In testimony that I claim the foregoing as my invention, I have signed my name in presence of two subscribing witnesses.

JOSEF SCHIESSLER.

Witnesses:
 JOSEF RUBASCH,
 AUGUST FUGGER.